US012762900B1

(12) United States Patent
Almond et al.

(10) Patent No.: US 12,762,900 B1
(45) Date of Patent: Oct. 13, 2026

(54) VERIFIED INTEGRATED VEHICLE IDENTIFICATION SYSTEM AND METHOD THEREOF

(71) Applicant: TransCore, LP, Nashville, TN (US)

(72) Inventors: Todd Almond, Mt. Juliet, TN (US); Venta Burton, Mt. Juliet, TN (US); William Darrell Pace, Hendersonville, TN (US); Philipp Orlov, San Marcos, CA (US); Srinivasan Narasimhan, Brentwood, TN (US)

(73) Assignee: TransCore, LP, Nashville, TN (US)

( * ) Notice: Subject to any disclaimer, the term of this patent is extended or adjusted under 35 U.S.C. 154(b) by 0 days.

(21) Appl. No.: 18/236,989

(22) Filed: Aug. 23, 2023

(51) Int. Cl.
*G07B 15/06* (2011.01)
*G06N 3/02* (2006.01)
*G06V 10/74* (2022.01)
*G06V 10/82* (2022.01)
*G06V 20/62* (2022.01)

(52) U.S. Cl.
CPC ............. *G07B 15/06* (2013.01); *G06V 10/74* (2022.01); *G06V 10/82* (2022.01); *G06V 20/625* (2022.01); *G06N 3/02* (2013.01)

(58) Field of Classification Search
CPC ........ G07B 15/06; G06V 10/74; G06V 10/82; G06V 20/625; G06N 3/02
See application file for complete search history.

(56) References Cited

U.S. PATENT DOCUMENTS 6,339,651 B1 * 1/2002 Tian ..................... G06V 30/153 340/5.1
6,587,586 B1 * 7/2003 Cui ....................... G06F 18/295 382/176
2006/0278705 A1 * 12/2006 Hedley ................ G07B 15/063 235/382

(Continued)

FOREIGN PATENT DOCUMENTS

CN 117274967 A * 12/2023 ............. G06V 10/82

OTHER PUBLICATIONS

Weohong et al. "Research on License Plate Recognition Algorithms Based on Deep Learning in Complex Environment" (IEEE Access, vol. 8, 2020, p. 91661-91675) (Year: 2020).*

*Primary Examiner* — Michael P Harrington
*Assistant Examiner* — Brian A Tallman
(74) *Attorney, Agent, or Firm* — Banner & Witcoff, Ltd.

(57) ABSTRACT

A system, and method thereof, is provided for tracking and referencing stored unique vehicle information corresponding to each of a plurality of vehicles and which is verified through license plate imagery. The system and method may reference past transaction history to increase confidence in data correlations in order to increase processing speed, accuracy and automation of workflow processes. The system may include a database having a plurality of unique vehicle identification data stores saved thereon and a computer program product operatively configured to direct performance of operations comprising receiving vehicle data of a new vehicle event, assimilating the vehicle data into a (Continued)

matching unique vehicle identification data store if the match is above a predetermined confidence threshold, and providing the vehicle data to a manual image review subsystem if the match is below the predetermined confidence threshold.

20 Claims, 5 Drawing Sheets

(56) References Cited

U.S. PATENT DOCUMENTS

| | | | | |
|---|---|---|---|---|
| 2015/0049914 | A1* | 2/2015 | Alves | G06V 20/63 382/105 |
| 2018/0089594 | A1* | 3/2018 | Duncker | G06N 7/01 |
| 2018/0268238 | A1* | 9/2018 | Khan | G06V 10/751 |
| 2022/0309809 | A1* | 9/2022 | Normington | G06V 30/10 |
| 2023/0004666 | A1* | 1/2023 | Beagle | G06V 20/625 |

* cited by examiner

VERIFIED INTEGRATED VEHICLE IDENTIFICATION SYSTEM AND METHOD THEREOF

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to automatic vehicle detection systems, and more particularly, the present disclosure relates to intelligent vehicle identification, verification, and event tracking systems.

2. Description of the Prior Art

Modern vehicle detection systems typically have at least one detection zone with a sensor system installed therein and configured to sense and capture data from a vehicle traveling through the detection zone. The captured data is generally used for transaction purposes. These systems treat each detected vehicle as a separate and unique event and must capture all necessary data (e.g., transponder information, vehicle classification data, vehicle images, etc.) in order to perform a complete transaction with said vehicle. Often times, the captured data is incomplete or not of sufficient quality to perform the transaction automatically towards secondary processing, thus triggering the need for manual image review via a back office or third party processor for verification of the captured data prior to performing the transaction. Manual image review may bog down and decrease the timeliness of this workflow process while also increasing costs associated with employing many manual image reviewers. Additionally, manual image review has proven to be subject to human error even when measures such as double-blind reviews are incorporated into the process. The back office or third party processor may also have accuracy requirements that require improved quality or additional details in order to perform the transaction.

BRIEF SUMMARY

In view of at least some of the above-referenced problems in vehicle detection, conventional tolling systems, and the like, an exemplary objective of the present disclosure is to provide a new verified integrated vehicle identification system, and method thereof, for tracking events of each unique vehicle which interacts with a detection zone of any type of vehicle detection system. An exemplary such system may desirably verify data and tracked events of each unique vehicle using license plate data. The exemplary such system may desirably reference a unique vehicles' past verified data and transaction history to increase confidence in data correlations, such as, for example, trip building discounts, transponder associations, vehicle classification, and further to increase timeliness, improve accuracy, and automate workflow processes. An exemplary such system may desirably feature real-time transaction processing performed by the primary detection systems, thereby avoiding sending data from said primary detection system to a back office or a third party processor which may have accuracy requirements that require improved quality or additional details in order to perform the transaction.

In a particular embodiment, an exemplary method of tracking and referencing unique vehicle information corresponding to each of a plurality of vehicles as disclosed herein may include providing at least one database having stored thereon a plurality of unique vehicle identification data stores, each of the plurality of unique vehicle identification data stores corresponding to a different vehicle of a plurality of tracked vehicles, each of the plurality of unique vehicle identification data stores including at least one unique vehicle identification event having a distributed numerical array representing a license plate of an associated vehicle of the plurality of tracked vehicles; receiving vehicle data from a vehicle sensory system, the vehicle data corresponding to a unique vehicle; assimilating the vehicle data into a matching unique vehicle identification data store of the plurality of unique vehicle identification data stores stored on the at least one database if the vehicle data matches the at least one unique vehicle identification event of one of the plurality of unique vehicle identification data stores above a predetermined confidence threshold; and providing the vehicle data to a manual image review subsystem for verification if the vehicle data does not match the at least one unique vehicle identification event of one of the plurality of unique vehicle identification data stores above the predetermined confidence threshold, the manual image review subsystem being configured to either generate a new unique vehicle identification data store corresponding to the vehicle data or assimilate the vehicle data into the matching unique vehicle identification data store.

In an exemplary aspect according to the above-referenced embodiment, the method may further include performing a transaction in response to receiving the vehicle data.

In another exemplary aspect according to the above-referenced embodiment, the method may further include performing historical analysis of the matching unique vehicle identification data store and applying a discounted pricing model to the transaction if the vehicle data is deemed to be associated with a qualifying event or group of events.

In another exemplary aspect according to the above-referenced embodiment, the method may further include performing a digital conversion of a license plate image from the vehicle data and defining a new distributed numerical array based on the digital conversion.

In another exemplary aspect according to the above-referenced embodiment, the method may further include performing a matching analysis of the plurality of unique vehicle identification data stores stored in the at least one database for matching the new distributed numerical array to the distributed numerical array of the matching unique vehicle identification data store, for example, using a convolutional neural network (CNN) module.

In another exemplary aspect according to the above-referenced embodiment, the method may further include determining a confidence level between the new distributed numerical array and the distributed numerical array of the matching unique vehicle identification data store and comparing the confidence level with the predetermined confidence threshold.

In another exemplary aspect according to the above-referenced embodiment, the method may further include implementing an artificial intelligence neural network to perform and iteratively improve the matching analysis.

In another exemplary aspect according to the above-referenced embodiment, the method may further include performing an integration service with at least one third party to capture additional verification data and assimilating the additional verification data with associated ones of the plurality of unique vehicle identification data stores.

In another exemplary aspect according to the above-referenced embodiment, the at least one third party may include at least the department of motor vehicles. Further, the additional verification data may include one or more of vehicle color data or owner address information data.

In another exemplary aspect according to the above-referenced embodiment, the method may further include sharing the plurality of unique vehicle identification data stores with a different agency of the plurality of agencies, wherein the provided at least one database is specific to one of the plurality of agencies.

In another embodiment, an exemplary system as disclosed herein may include at least one database having stored thereon a plurality of unique vehicle identification data stores. Each of the plurality of unique vehicle identification data stores may correspond to a different vehicle of a plurality of tracked vehicles. Each of the plurality of unique vehicle identification data stores may include at least one unique vehicle identification event having a distributed numerical array representing a license plate of an associated vehicle of the plurality of tracked vehicles.

In an exemplary aspect according to the above-referenced embodiment, the computer program product may further be configured to perform a transaction in response to receiving the vehicle data.

In another exemplary aspect according to the above-referenced embodiment, only the matching unique vehicle identification data store includes digital data necessary to perform the transaction. Further, the vehicle data may be supplemented with the digital data from the matching unique vehicle identification data store for performing the transaction.

In another exemplary aspect according to the above-referenced embodiment, the computer program product may further be configured to perform historical analysis of the matching unique vehicle identification data store and apply a discounted pricing model to the transaction if the vehicle data is deemed to be associated with a qualifying event or group of events.

In another exemplary aspect according to the above-referenced embodiment, the vehicle data may include a license plate image taken of the corresponding vehicle. Further, the computer program product may be configured to perform a digital conversion of the license plate image into a new distributed numerical array.

In another exemplary aspect according to the above-referenced embodiment, the computer program product may further be configured to perform a matching analysis of the plurality of unique vehicle identification data stores stored in the at least one database for matching the new distributed numerical array to the distributed numerical array of the matching unique vehicle identification data store using Euclidean Distance regression modeling.

In another exemplary aspect according to the above-referenced embodiment, the computer program product may further be configured, during the matching analysis, to determine a confidence level between the new distributed numerical array and the distributed numerical array of the matching unique vehicle identification data store and to compare the confidence level with the predetermined confidence threshold.

In another exemplary aspect according to the above-referenced embodiment, the computer program product may further be configured to implement an artificial intelligence neural network to perform and iteratively improve the matching analysis.

In another exemplary aspect according to the above-referenced embodiment, the corresponding vehicle may be a new vehicle or one of the plurality of tracked vehicles.

In another exemplary aspect according to the above-referenced embodiment, the computer program product may further be configured to perform an integration service with at least one third party to capture additional verification data to be assimilated with each of the plurality of unique vehicle identification data stores.

In another exemplary aspect according to the above-referenced embodiment, the at least one third party may include at least the department of motor vehicles. Further, the additional verification data may include one or more of vehicle color data or owner address information data.

In another exemplary aspect according to the above-referenced embodiment, the at least one database is specific to one of a plurality of agencies. Further, the computer program product may further be configured to share the plurality of unique vehicle identification data stores with a different one of the plurality of agencies.

In another exemplary aspect according to the above-referenced embodiment, the computer program product may further be configured to receive data from the different one of the plurality of agencies.

DETAILED DESCRIPTION

Figure 1:
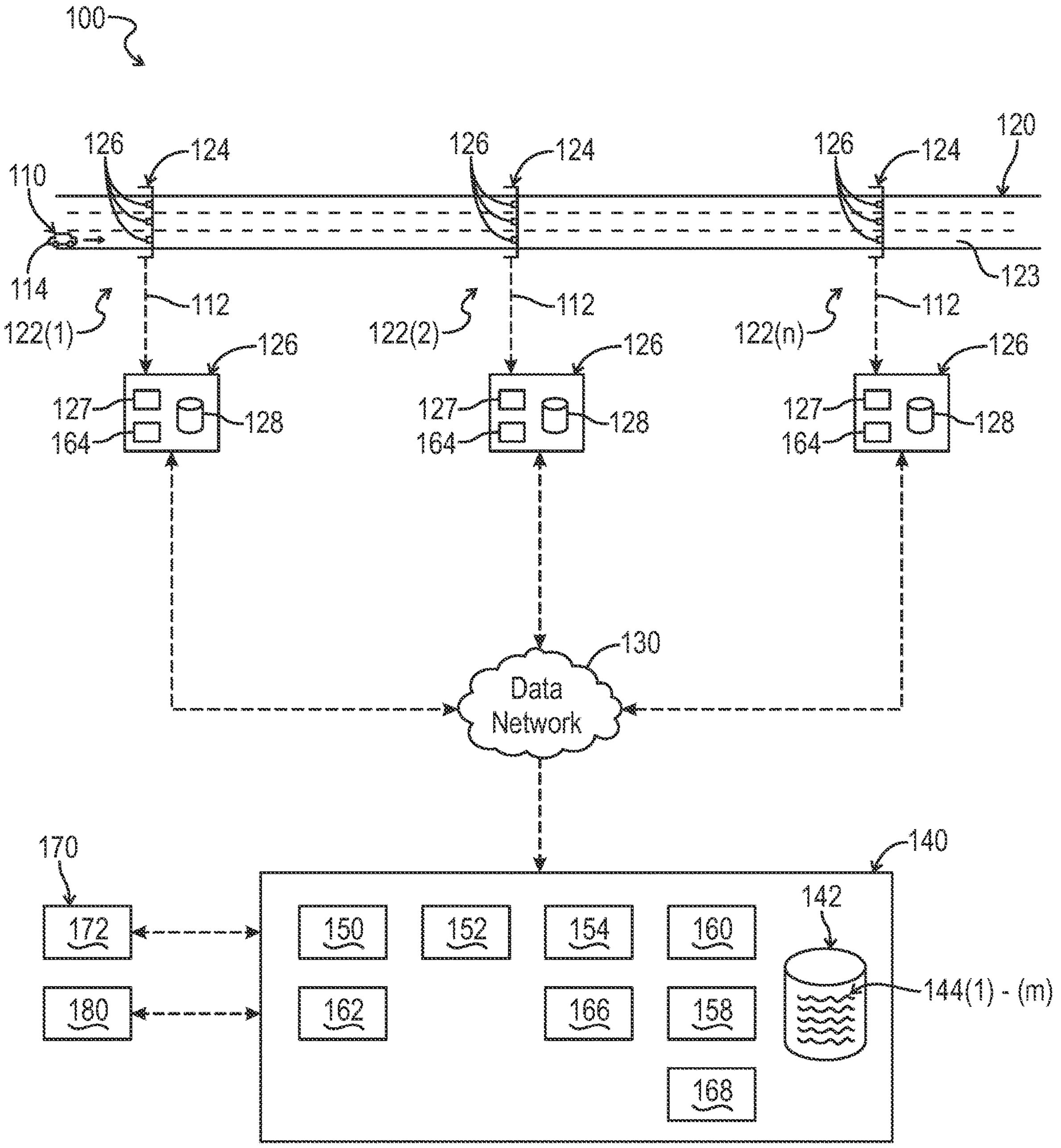
FIG. 1 is a diagram of an embodiment of a system in accordance with the present disclosure.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Reference throughout this specification to "one embodiment," "an embodiment," "another embodiment," "optional embodiment" or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(*n*)" where n may include a number. Referring to one of the elements as "Element 102" refers to any single element of the Elements 102(1)-(*n*). Additionally, referring to different elements "First Elements 102(1)-(*n*)" and "Second Elements 104(1)-(*n*)" does not necessarily mean that there must be the same number of First Elements as Second Elements and is equivalent to "First Elements 102(1)-(*n*)" and "Second Elements (1)-(*m*)" where m is a number that may be the same or may be a different number than n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the term "computing platform" or "platform" may include a computing environment where a portion of software can execute. A computing platform may include hardware on which the software may execute. The computing platform may include an operating system. The computing platform may include one or more software applications, scripts, functions, or other software. The computing platform may include one or more application programming interfaces (APIs) by which different portions of the software of the platform may communicate with each other or invoke functions. The computing platform may include one or more APIs by which it may communicate with external software applications or by which external software applications may interact with the platform. The computing platform may include a software framework. The computing platform may include one or more VMs. The computing platform may include one or more data storages. The computing platform may include a client application that executes on an external computing device and that interacts with the platform in a client-server architecture.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "message" may include one or more formats for communicating (e.g., transmitting or receiving) information or data. A message may include a machine-readable collection of information such as an Extensible Markup Language (XML) document, fixed-field message, comma-separated message, or another format. A message may, in some implementations, include a signal utilized to transmit one or more representations of information or data.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described, such software application able to both send and receive pertinent performance data.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions.

As used herein, the term "data object" may include a logical container for data. A data object may include an instance of an object in a software application implemented with an object-oriented programming language. A data object may include data formatted in an electronic data interchange (EDI) format, such as an Extensible Markup Language (XML) object, a JavaScript Object Notation (JSON) object, or some other EDI-formatted object. A data object may include one or more functions that may manipulate the data of the data object. For example, a data object may include the functions or methods of an object in a software application implemented with an object-oriented programming language.

Figure 2:
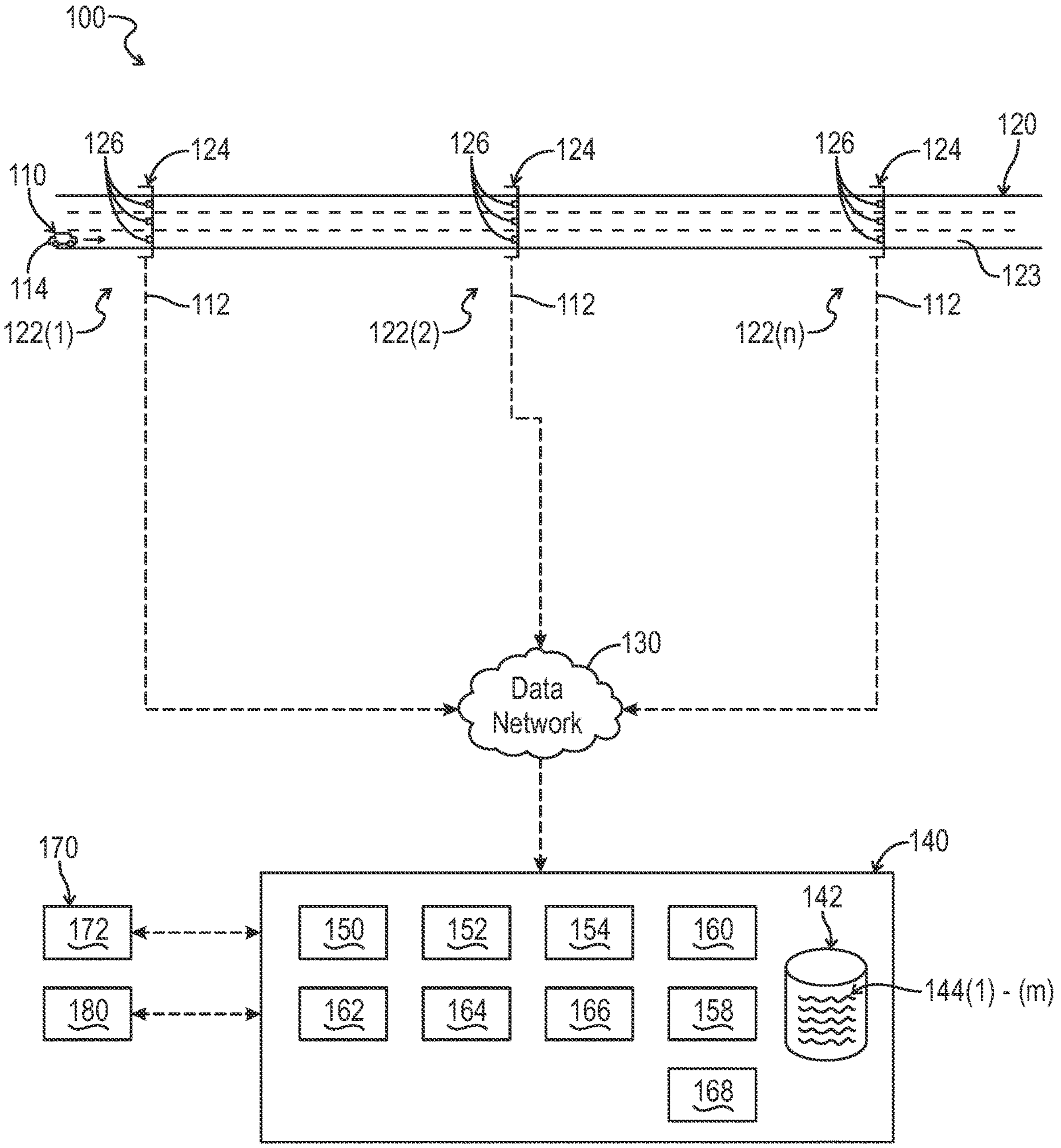
FIG. 2 is a diagram of another embodiment of a system in accordance with the present disclosure.

Referring to FIGS. 1-2, a system 100 for tracking and referencing unique vehicle information corresponding to each of a plurality of vehicles is provided. The system 100 may be configured to track events for a corresponding vehicle. The events of the corresponding vehicle may be grouped and grouping accuracy verified through license plate imagery. The events may also be referred to herein as transaction events. The system 100 may leverage automatic reference to past transactions histories of corresponding vehicles to increase confidence in data correlations, such as, for example, in trip building, transponder associations, and simple vehicle classifications, especially when certain necessary vehicle information is missing. The system 100 may increase timeliness, accuracy, and automation of workflow processes.

Events, as used herein, generally correspond to vehicle tolling events whereby a tolling authority is responsible for the administration and collection of tolls or fees on a specific transportation infrastructure, such as toll roads, bridges, tunnels, or express lanes. A tolling authority may be a government agency or a privately owned tolling operation, which may be specific to a locality, a state, or a transportation infrastructure. As such, a plurality of tolling authorities exist, each generally operating independently. In the context of tolling, a vehicle pays a fee to utilize the specific roadway. In other optional embodiments, the system 100 may be equally applicable to other events, such as, for example, the utilization of a parking facilities, restricted access roadways, electric vehicle (EV) charging stations, or any other vehicle-based pay-for-use system. As such, the events may originate from a plurality of different sensing locations or a single sensing location.

The system 100 may be configured to receive vehicle data 112 associated with a corresponding vehicle 110 from a tolling system 120. The tolling system 120 may include a plurality of tolling stations 122(1)-(*n*) (also known as plazas) positioned along a toll road 102 or other transportation infrastructure. Each of the plurality of tolling stations 122(1)-(*n*) may include a vehicle detection system 124. The vehicle detection system 124 may also be referred to herein as a vehicle sensing system 124. The vehicle detection system 124 may include one or more sensors 125, such as, for example, RFID readers, cameras, or the like. As the corresponding vehicle 110 travels through one of the plurality of tolling stations 122(1)-(*n*), vehicle data 112 corresponding to the corresponding vehicle 110 is captured by the vehicle detection system 124 and may be stored locally on an on-site server 126. Each of the plurality of tolling stations 122(1)-(*n*) may include an on-site server 126. The on-site server 126 may include at least a processor 127 and a local database 128. The vehicle data 112 may be transmitted from the on-site server 126 to a central server 140 via a data network 130. In other optional embodiments, as illustrated in FIG. 2, the vehicle data 112 captured by the vehicle detection system 124 may be transmitted directly to a central server 140 via the data network 130.

In the context of the system 100 as disclosed herein, the one or more sensors 125 of the vehicle detection system 124 may include at least one camera configured to take a picture of the corresponding vehicle 110 including its license plate 114. As such, the vehicle data 112 of the corresponding vehicle 110 may generally include at least Automated License Plate Reader (ALPR) data and images.

In certain optional embodiments, various other types of vehicle data may be collected to facilitate the toll collection process. The specific data collected can vary depending on the technology and systems used by the tolling authority or at each of the plurality of tolling stations 122(1)-(*n*). This may include such information as the vehicle class, which helps determine the appropriate toll rate based on the type of vehicle. Additional vehicle identification data, such as license plate numbers or electronic toll collection transponder identifiers, is captured to identify the vehicle for billing and enforcement purposes. A profile, number of axles, or the presence of a trailer may also be captured to determine or verify a toll classification of the corresponding vehicle 110. The date and time of the vehicle's passage through the tolling station are recorded to calculate toll charges accurately, particularly if toll rates vary based on the time of day. Location data is collected to determine distance-based tolls or differentiate toll rates across different sections of the road. Transaction details, such as the toll amount paid, method of payment, and any additional fees or discounts, are also recorded. In some systems, cameras may be used to capture images of vehicles for verification, enforcement, or dispute resolution.

The central server 140 of the system 100 may include a database 142 having stored thereon a plurality of unique vehicle identification data stores 144(1)-(*m*). The database 142 may also be referred to herein as data storage 142. Each of the plurality of unique vehicle identification data stores 144(1)-(*m*) may correspond to one of a plurality of tracked vehicles 108(1)-(*m*) (shown in FIG. 3) having passed through at least one of the plurality of tolling stations 122(1)-(*n*) of the tolling system 120. In essence, the plurality of unique vehicle identification data stores 144(1)-(*m*) correlate transactions events over time to build a verified history of each vehicle of the plurality of tracked vehicles 108(1)-(*m*).

Figure 3:
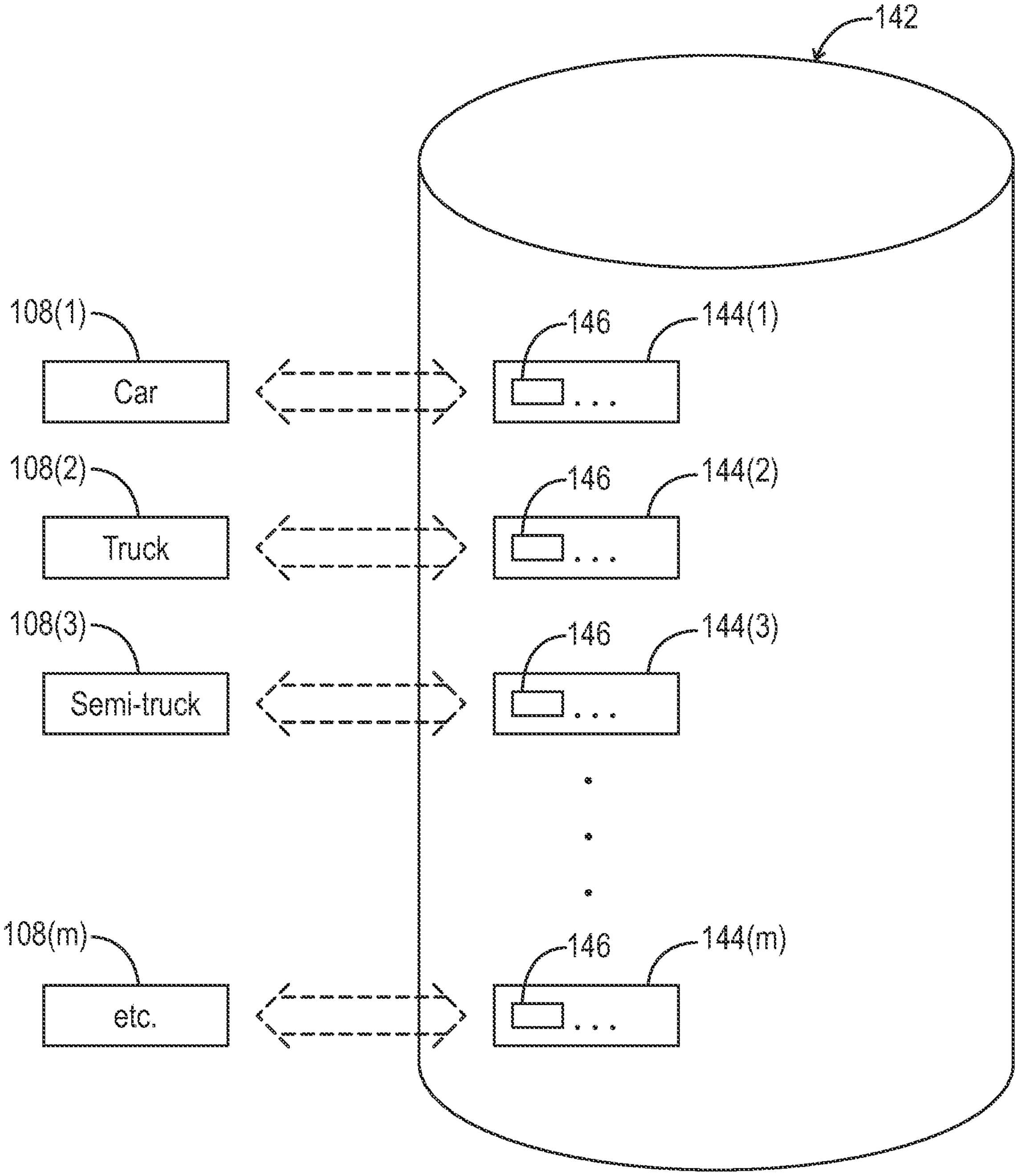
FIG. 3 is a diagram of a plurality of vehicles and corresponding unique vehicle identification data stores in accordance with the present disclosure.
Figure 4:
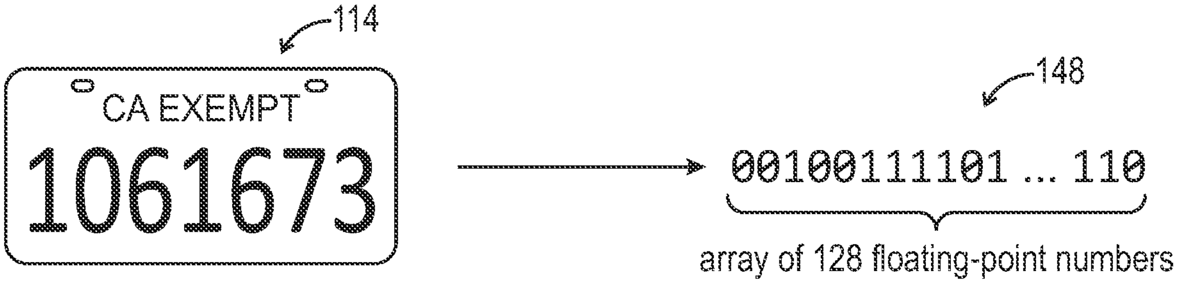
FIG. 4 is a diagram of a distributed numerical array corresponding to a license plate of a corresponding vehicle in accordance with the present disclosure.

Referring to FIG. 3, each of the plurality of unique vehicle identification data stores 144(1)-(*m*) may include at least one unique vehicle identification event 146. Each of the at least one unique vehicle identification event 146 may correspond with an interaction with one of the plurality of tolling stations 122(1)-(*n*). The at least one unique vehicle identification event 146 may also be referred to herein as a transaction event 146. Each of the at least one unique vehicle identification event 146 may include one or more of transponder data (i.e., RFID, Bluetooth, or otherwise), ALPR data, vehicle images, vehicle characteristics data, vehicle classification data, time and date information, or the like. The ALPR data may include a distributed numerical array (DNA) 148, shown in FIG. 4, representing the license plate from a picture (e.g., from said event) of a corresponding vehicle of the plurality of tracked vehicles 108(1)-(*m*). The plurality of tracked vehicles 108(1)-(*m*) may also be referred to herein as a plurality of known vehicles 108(1)-(*m*). As additional unique vehicle identification event 146 are recorded and assimilated into the plurality of unique vehicle identification data stores 144(1)-(*m*), the accuracy and confidence of the system 100 may improve.

In certain optional embodiments, each of the plurality of unique vehicle identification data stores 144(1)-(*m*) may include every event of that particular vehicle from its first event to its most recent. In other optional embodiments, each of the plurality of unique vehicle identification data stores 144(1)-(*m*) may include only a representative sample of the all of the events. For example, the representative sample may represent the distributed numerical array 148 of the license plate under different weather conditions, different lighting conditions and/or some other condition which might affect the associated picture quality of the license plate.

The system 100 may further include a computer program product 150 residing on a non-transitory computer readable medium 152 and executable by one or more processors 154, all of which may be located within the central server 140. The computer program product 150 may also be referred to herein as a computing platform 150. In other optional embodiments, the computer program product 150, or a portion thereof may reside on the on-site server 126 of one or more of the plurality of tolling stations 122(1)-(*n*).

Figure 5:
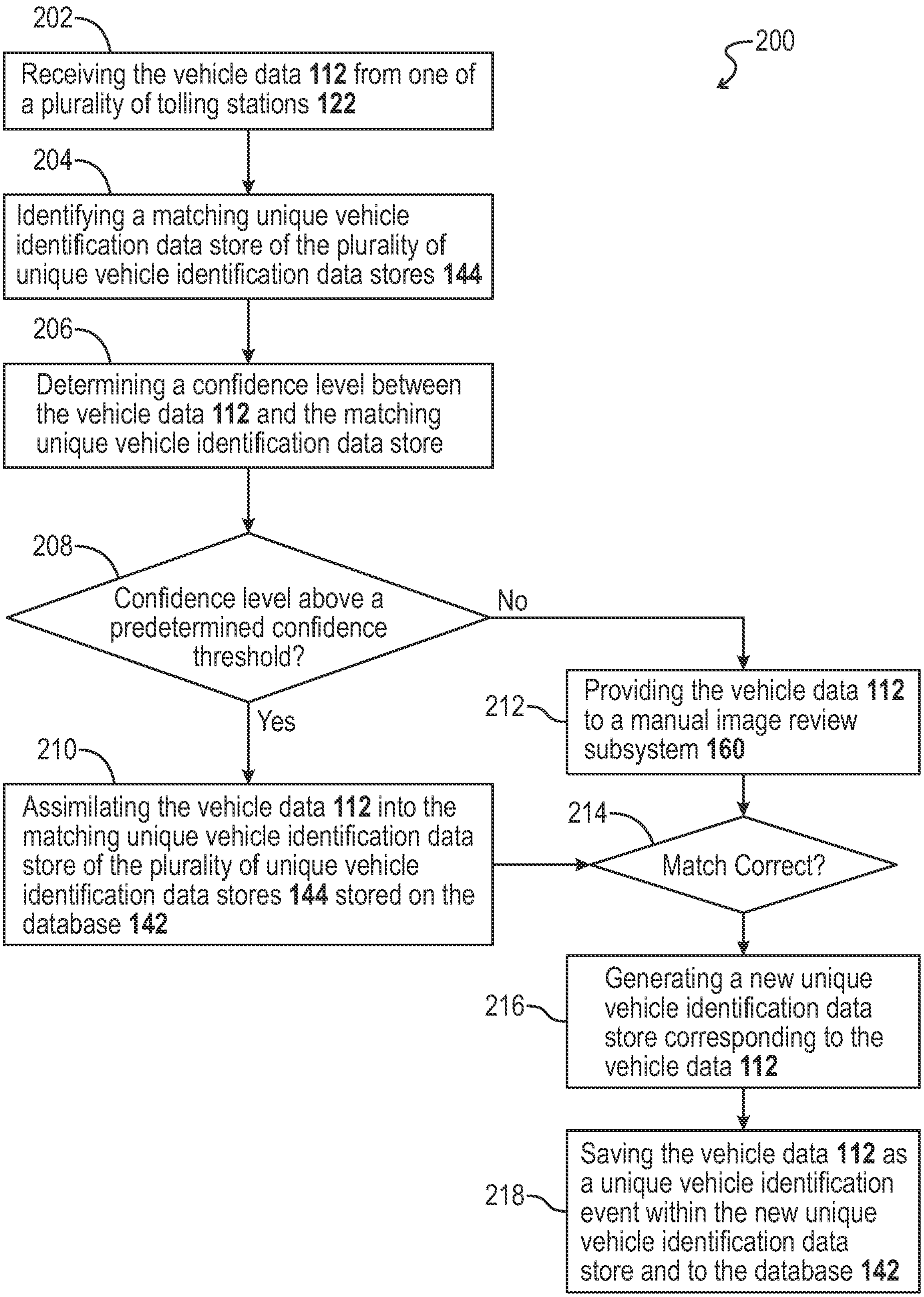
FIG. 5 is a flowchart of an embodiment of a method in accordance with the present disclosure.

The computer program product 150 may be executable by the one or more processors 154 to direct performance of operations, which may be represented by a method 200 of tracking and referencing unique vehicle information corresponding to a plurality of vehicles, as illustrated in FIG. 5. As such, the method 200 is executable by the system 100.

The method 200 may include receiving 202 the vehicle data 112 from a vehicle detection system 124, for example, of one of the plurality of tolling stations 122(1)-(*n*). The vehicle data 112 may be received by the central server 140 via the data network 130, either directly (shown in FIG. 2) or as passed through the on-site server 126 (shown in FIG. 1).

The method 200 may further include identifying 204 a matching unique vehicle identification data store of the plurality of unique vehicle identification data stores 144(1)-(*m*) stored on the database 142 to the vehicle data 112. This matching step, for example, may be performed by an inference module 162 of the system 100. The inference module 162 may also be referred to herein as an inference service 162. In certain optional embodiments, this step may include performing a digital conversion of the license plate 114 image from the vehicle data 112 and defining a new distributed numerical array 148 based on the digital conversion. This digital conversion may, for example, be performed by a neural network module 164 of the system 100. The neural network module 164 may also be referred to herein as a convolutional neural network module 164 or a neural network service 164. In other optional embodiments, this step may include performing a matching analysis of the plurality of unique vehicle identification data stores 144(1)-(*m*) stored in the database 142 for matching the new distributed numerical array 148 to the distributed numerical array of the matching unique vehicle identification data store 144. In certain optional embodiments, as illustrated in FIG. 1, each of the plurality of tolling stations 122(1)-(*n*) may include a neural network module 164, which may be executed on the on-site server 126. This configuration may support efficiency during degraded communications between the plaza (e.g., one of the plurality of tolling stations 122(1)-(*n*)) and host systems (e.g., the central server 140) if certain levels of autonomous operation are desired. In other optional embodiments, as illustrated in FIG. 2, the neural network module 164 may be executed on the central server 140. In further optional embodiments, each of the on-site server 126 and the central server may include a neural network module.

The method 200 may further include determining 206 a confidence level between the vehicle data 112 and the matching unique vehicle identification data store of the plurality of unique vehicle identification data stores 144(1)-(*m*), as further discussed below.

The method 200 may further include determining 208 whether the confidence level is above a predetermined confidence threshold. The predetermined confidence threshold may be based, at least in part, on a comparison between the distributed numerical array 148 of the matching unique vehicle identification data store and the new distributed numerical array of the vehicle data 112. The predetermined confidence threshold may also be based at least in part upon customer specific accuracy requirements. The confidence level threshold may be dynamically adjusted within the system 100 and not just a single fixed confidence. For example, there may be specific Jurisdiction or State license plate types that are problematic and when identified would require a higher confidence threshold for automation. For standard issue plates, a lower confidence threshold may provide acceptable automation results. The 'tuning' of a system for optimization of automation may necessarily have to balance accuracy and efficiency based on a customer desired tolerance to error. For example, false-positive reporting to an incorrect customer account and charging said incorrect customer $85 for a semi-truck going into the city would be unacceptable and mean the confidence level threshold needs adjusting. Use based cases may also impact confidence level threshold. For example, if the system 100 results are being used towards Law Enforcement Notifications of vehicles of interest, the confidence level thresholds of that workflow may be quite low. In such cases, the confidence level threshold may be custom set for a specific vehicle license plate or group of vehicles. Further, in such cases, false-positive reporting of a match is better than letting a suspect pass undetected.

If the confidence level is above the predetermined confidence threshold, then the method 200 may further include assimilating 210 the vehicle data 112 into the matching unique vehicle identification data store of the plurality of unique vehicle identification data stores 144(1)-(*m*) stored on the database 142, for example, as a new unique vehicle identification event of the at least one unique vehicle identification event 146 of that data store.

If the confidence level is below the predetermined confidence threshold, then the method 200 may further include providing 212 the vehicle data 112 to a manual image review subsystem 160. The manual image review subsystem 160 may also be referred to herein as a manual image review module 160. Within the manual image review subsystem 160, the method 200 may include determining 214 whether the match is correct. This step may also be referred to herein as manual data and image review and may be performed by physical employees. In order to avoid potentially influencing or biasing an employee's review, the confidence level may be hidden and the employee may be required to enter all data for the vehicle based on the raw sensed data and images. As such, data from the manual image review subsystem 160 may be utilized to improve automation of system 100. For example, the ALPR may be utilized as a second review to compare and proceed in the system's workflow.

If, upon manual review, the vehicle data 112 does not match the matching unique vehicle identification data store of the plurality of unique vehicle identification data stores 144(1)-(*m*), then the method 200 may include generating 216 a new unique vehicle identification data store corresponding to the vehicle data 112 and saving 218 the vehicle data 112 as a unique vehicle identification event within the new unique vehicle identification data store and to the database 142. In certain optional embodiments, no match may be found for the vehicle data 112 and the method 200 may proceed directly to generating 216 the new unique vehicle identification data store. In other optional embodiments, the confidence level of the match is so low, that the method proceeds directly to generating 216 the new unique vehicle identification data store. In certain optional embodiments, prior to generating 216 a new unique vehicle identification data store corresponding to the vehicle data 112, the method 200 may include repeating the step of identifying 204 a matching unique vehicle identification data store of the plurality of unique vehicle identification data stores 144(1)-(*m*), however, this time using the manually entered data from the manual image review subsystem 160. This may act as a data cleansing process to maintain the integrity of system outputs and data stored within the system 100.

If, upon manual review, the vehicle data 112 does match the matching unique vehicle identification data store of the plurality of unique vehicle identification data stores 144(1)-(*m*), then the method 200 may proceed to assimilate the vehicle data 112 into the matching unique vehicle identification data store as a new event.

In certain optional embodiments, the method 200 may further include implementing an artificial intelligence (AI) neural network module 158 to perform and iteratively improve the matching analysis. In other optional embodiments, the AI neural network module 158 may be configured to iteratively improve the confidence level determination between the vehicle data 112 and the matching unique vehicle identification data store of the plurality of unique vehicle identification data stores 144(1)-(*m*). In other words, the artificial intelligence neural network improves the accuracy, results, and automation of the system 100. Tuning of configurations, using the AI neural network module 158 or otherwise, affects system efficiency and accuracy while also striking a balance with the desire for increased automation performance.

In further optional embodiments, the method 200 may further include implementing an integration module 166 with at least one third party 170 to capture additional verification data 172. The integration module 166 may also be referred to herein as an integration service 166. The method 200 may further include assimilating the additional verification data into associated ones of the plurality of unique vehicle identification data stores 144(1)-(*m*). The at least one third party 170 may include one or more of a department of motor vehicles, Lyft®, Uber®, or other vehicle for hire services (e.g., ride-share vehicles). For example, the department of motor vehicles may be that of a state associated with the tolling agency who manages the specific tolling system 120. In other optional embodiments, the department of motor vehicles may be of a state different than the state in which the tolling agency who manages the specific tolling system 120 operates. In said example, the additional verification data 172 may include one or more of vehicle color data, owner address information data, or the like, which may be used to improve confidence levels and automated results of the system 100. For example, ride-share vehicles may share active driver listings when they respond to a ride request. Additionally, fleet vehicles may be registered for third party management services. The goal is to have verified plate and vehicle type information, without necessarily having the private owner's information. In certain optional embodiments, the system 100 may avoid collection of owner details to remain outside of privacy law issues.

In other optional embodiments, the method 200 may further include sharing the plurality of unique vehicle identification data stores 144(1)-(*m*) with a different one of a plurality of tolling agencies 180. By sharing the plurality of unique vehicle identification data stores 144(1)-(*m*), a tolling agency can improve their accuracy and automation, especially with respect to new vehicles which the system 100 has no prior interaction.

In certain optional embodiments, the method 200 may further include performing a transaction in response to receiving the vehicle data 112. The amount of the transaction may be based, at least in part, on a classification of the corresponding vehicle 110. The classification of the corresponding vehicle 110 fit within a customer specific classification model and may be based on one or more of the vehicle data 112 or the matching unique vehicle identification data store of the plurality of unique vehicle identification data stores 144(1)-(*m*). When sharing the data, rather than the classification of the corresponding vehicle 110, other agencies utilizing different classification models may easily import the data and class vehicles using their different classification model.

In other optional embodiments, the method 200 may further include performing discrete historical analysis of the matching unique vehicle identification data store (e.g., for same day events or events falling within a qualifying timeline) and applying a discounted pricing model to the transaction if the vehicle data is deemed to be associated with a qualifying event or group of events. This post processing of vehicle events may be for express lanes, dynamic pricing models, and congestion pricing models. Vehicle events matching associated with the matching unique vehicle identification data store of the plurality of unique vehicle identification data stores 144(1)-(*m*) can be easily grouped by location and time for logical trip discount processing. The system 100 and the method 200 may thus improve the timeliness of associating vehicle events to a single trip for consolidated pricing and reporting. The associated automation of the system 100 and the method 200 reduces the time previously necessary for manual image review to provide data used for trip building processes. The system 100 and the method 200 enables full customization of the parameters used in trip pricing, discounts, and/or exemptions.

In certain optional embodiments, the historical analysis performed by the method 200 may include extrapolating past driver behavior or trends that may allow confidence to predict a similar behavior when the system 100 has missing vehicle transactions for a day. The system 100 may extrapolate same vehicle commutes every day or every week at the same times, such that, for example, it sees them entering and leaving within 30-minute time windows during peak periods. The system 100 may record them entering and never exiting and may imply an exit based on a configured number of past observances and if this is to their benefit.

In further optional embodiments, the method 200 may further include patching the inference module 162 with verified updates to one or more of the plurality of unique vehicle identification data stores 144(1)-(*m*). The verified updates may include new unique vehicle identification data stores, new unique vehicle identification events, additional verification data from the at least one third party 170, or shared data from different tolling agencies of a plurality of tolling agencies 180. In certain optional embodiments, the verified updates (or patch) must include an image of the license plate 114 from the system 100, verified ALPR data supplied by manual image review subsystem 160 or other source, the identifier created for the vehicle in the data store. The image may be of most significance as that produces the DNA 148 applied to the neural network module 164.

In certain optional embodiments, the inference module 162 of the system 100 may be performed within the central server 140, or optionally by the on-site server 126 which may initially receive the vehicle data 112. The inference module 162 may further improve machine automation of a tolling system 120 beyond what is possible with raw optical character recognition results received from lane-level systems since low confidence ALPR results are matched to historical records (i.e., a matching unique vehicle identification data store of the plurality of unique vehicle identification data stores 144(1)-(*m*)). The inference module 162 may utilize a custom search algorithm that matches a distributed numerical array 148 of the vehicle data 112 to an associated one or more distributed numerical array of the at least one unique vehicle identification event 146. The custom search algorithm may implement a Euclidean Distance modeling or the like. Matches may be reported with their calculated Euclidean Distance which may be used for determining the confidence level of the match, for example, as the calculated Euclidean Distance approaches zero, the confidence increases.

In other optional embodiments, the method 200 may further include utilizing an automation integration rules (AIR) module 168 to configure decision logic based on the content of the each of the at least one unique vehicle identification event 146 of a vehicle, the content of the plurality of unique vehicle identification data stores 144(1)-(*m*), the confidence of outputs from inference module 162, or the absence of a match to the vehicle data 112 for routing images to the manual image review module 160. The AIR module 168 is a highly configurable customer-specific business rule engine of the system 100 that may be tuned to balance automation efficiency and accuracy and may have multiple workflows modeled within a single instance. For example, vehicle tolling and vehicle enforcement to alert police. Both processes may occur in parallel with different rules. In certain optional embodiments, additional processes occur in parallel with one another and execute following different rules.

In certain optional embodiments, the neural network module 164 of the system 100 may be performed within the central server 140, or optionally by the on-site server 126 which may initially receive the vehicle data 112. The neural network module 164 may be a post process, which may in certain embodiments be independent of or part of the inference module 162, that creates the distributed numerical array 148 representing the license plate 114 picture region of interest. In certain optional embodiments, the distributed numerical array 148 may comprise an array of 128 floating-point numbers representing the license plate 114 picture region of interest. In other optional embodiments, the distributed numerical array 148 may comprise additional or fewer floating-point numbers.

In other optional embodiments, the system 100 may replicate data between tiers of the architecture (e.g., between the on-site server 126 of each of the plurality of tolling stations 122(1)-(*n*) and the central server 140) to distribute processing and may support improved efficiency, operations, automations, timeliness of data within interfaces, and data synchronization.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of new and useful systems and methods dynamically providing content, it is not intended that such references be construed as limitations upon the scope of this disclosure.

What is claimed is:

1. A method for automatically reconciling disparities identified in events captured by a tolling system, the method comprising:

providing, to each on-site server of a plurality of different on-site servers, a first neural network executable by each of the plurality of different on-site servers, wherein each of the plurality of different on-site servers corresponds to a different tolling station comprising one or more cameras, and wherein the first neural network is configured to perform digital conversions of images of license plates to numeric strings;

receiving, by a central server, from a first on-site server of a first tolling system, and after providing the first neural network:

an image, captured via a first camera of the first tolling system at a first time, of a license plate of a vehicle, first vehicle classification data, and a first distributed numerical array, wherein the first distributed numerical array was generated, by the first on-site server, by processing, using the first neural network, the image of the license plate wherein the first distributed numerical array comprises an array of numbers representing a region of interest of the image of the license plate;

generating, by the central server, a second distributed numerical array by processing, using a second neural network, the image of the license plate;

determining, by the central server and using a third neural network:

a first confidence level corresponding to a match between the first distributed numerical array and a first unique vehicle record of a plurality of unique vehicle records;

a second confidence level corresponding to a second match between the second distributed numerical array and a second unique vehicle record of the plurality of unique vehicle records;

identifying a matching unique vehicle record of the plurality of unique vehicle records by selecting, based on the first confidence level and the second confidence level, one of the first distributed numerical array or the second distributed numerical array;

receiving, by the central server, via a transponder reader of the first tolling system, and at a second time after the first time, transponder data and second vehicle classification data corresponding to the matching unique vehicle record;

identifying, by the central server, a vehicle classification disparity by:

identifying, by the central server, at least one difference between the first vehicle classification data, the second vehicle classification data, or third vehicle classification data corresponding to the matching unique vehicle record;

iteratively improving the second neural network by modifying, based on the vehicle classification disparity, one or more configurations of the third neural network to tune future correlations between numerical arrays and the plurality of unique vehicle records; and modifying, based on the at least one difference, the matching unique vehicle record.

2. The method of claim 1, wherein the identifying the vehicle classification disparity is further based on calculating a Euclidean distance between the first distributed numerical array and the second distributed numerical array.

3. The method of claim 1, wherein the identifying the vehicle classification disparity is further based on determining that the first distributed numerical array corresponds to one or more jurisdictional license plates that are known to be difficult to identify.

4. The method of claim 1, wherein the first unique vehicle record corresponds to a different vehicle than the second unique vehicle record.

5. The method of claim 1, wherein the second unique vehicle record comprises data from a ride-share service.

6. The method of claim 1, further comprising:

verifying the image of the license plate before providing it to the second neural network.

7. The method of claim 1, wherein the identifying the vehicle classification disparity is further based on additional data regarding the vehicle received from a third party fleet management service.

8. The method of claim 1, wherein the image was captured in a first geographic region associated with a first governmental entity, and wherein the identifying the matching unique vehicle record is further based on additional data provided by a second governmental entity different from the first governmental entity.

9. The method of claim 1, further comprising:

storing, based on the first distributed numerical array, a tolling event in a database.

10. The method of claim 1, wherein the selecting the one of the first distributed numerical array or the second distributed numerical array comprises comparing the first confidence level to a threshold.

11. The method of claim 1, wherein the first unique vehicle record comprises a representative sample distributed numerical array based on digital conversions in different weather conditions.

12. A non-transitory computer-readable medium storing instructions that, when executed, cause:

providing, to each on-site server of a plurality of different on-site servers, a first neural network executable by each of the plurality of different on-site servers, wherein each of the plurality of different on-site servers corresponds to a different tolling station comprising one or more cameras, and wherein the first neural network is configured to perform digital conversions of images of license plates to numeric strings;

receiving, by a central server, from a first on-site server of a first tolling system, and after providing the first neural network:

an image, captured via a camera of a first tolling system at a first time, of a license plate of a vehicle, first vehicle classification data, and a first distributed numerical array, wherein the first distributed numerical array was generated, by the first on-site server, by processing, using the first neural network, the image of the license plate, wherein the first distributed numerical array comprises an array of numbers representing a region of interest of the image of the license plate;

generating, by the central server, a second distributed numerical array by processing, using a second neural network, the image of the license plate;

determining, by the central server and using a third neural network:

a first confidence level corresponding to a match between the first distributed numerical array and a first unique vehicle record of a plurality of unique vehicle records;

a second confidence level corresponding to a second match between the second distributed numerical array and a second unique vehicle record of the plurality of unique vehicle records;

identifying a matching unique vehicle record of the plurality of unique vehicle records by selecting, based on the first confidence level and the second confidence level, one of the first distributed numerical array or the second distributed numerical array;

receiving, by the central server, via a transponder reader of the first tolling system, and at a second time after the first time, transponder data and second vehicle classification data corresponding to the matching unique vehicle record;

identifying, by the central server, a vehicle classification disparity by:

identifying, by the central server, at least one difference between the first vehicle classification data, the second vehicle classification data, or third vehicle classification data corresponding to the matching unique vehicle record;

iteratively improving the second neural network by:

modifying, based on the vehicle classification disparity, one or more configurations of the third neural network to tune future correlations between numerical arrays and the plurality of unique vehicle records; and modifying, based on the at least one difference, the matching unique vehicle record.

13. The non-transitory computer-readable medium of claim 12, wherein the instructions, when executed, cause the identifying the vehicle classification disparity further based on calculating a Euclidean distance between the first distributed numerical array and the second distributed numerical array.

14. The non-transitory computer-readable medium of claim 12, wherein the instructions, when executed, further cause the identifying the vehicle classification disparity is further based on determining that the first distributed numerical array corresponds to one or more jurisdictional license plates that are known to be difficult to identify.

15. The non-transitory computer-readable medium of claim 12, wherein the first unique vehicle record corresponds to a different vehicle than the second unique vehicle record.

16. The non-transitory computer-readable medium of claim 12, wherein the second unique vehicle record comprises data from a ride-share service.

17. The non-transitory computer-readable medium of claim 12, wherein the instructions, when executed, further cause verifying the image of the license plate before providing it to the second neural network.

18. The non-transitory computer-readable medium of claim 12, wherein the instructions, when executed, further cause the identifying the vehicle classification disparity further based on additional data regarding the vehicle received from a third party fleet management service.

19. The non-transitory computer-readable medium of claim 12, wherein the image was captured in a first geographic region associated with a first governmental entity, and wherein the instructions, when executed, cause the identifying the matching unique vehicle record further based on additional data provided by a second governmental entity different from the first governmental entity.

20. The non-transitory computer-readable medium of claim 12, wherein the first unique vehicle record comprises a representative sample distributed numerical array based on digital conversions in different weather conditions.

* * * * *